United States Patent
Alvarez Ruiz et al.

(10) Patent No.: US 10,286,822 B1
(45) Date of Patent: May 14, 2019

(54) ADJUSTABLE HEADREST ASSEMBLY FOR VEHICLE SEAT

(71) Applicant: Ford Global Technologies, LLC, Dearborn, MI (US)

(72) Inventors: Raul Ezequiel Alvarez Ruiz, Mexico City (MX); Cuauhtemoc Quiroz Garfias, Mexico City (MX); Alfonso Hickman Guevara, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/866,602

(22) Filed: Jan. 10, 2018

(51) Int. Cl.
  *B60N 2/815* (2018.01)
  *B60N 2/818* (2018.01)
  *B60N 2/844* (2018.01)
  *B60N 2/847* (2018.01)

(52) U.S. Cl.
  CPC ............ *B60N 2/815* (2018.02); *B60N 2/818* (2018.02); *B60N 2/844* (2018.02); *B60N 2/847* (2018.02)

(58) Field of Classification Search
  CPC ........ B60N 2/818; B60N 2/847; B60N 2/844; B60N 2/841; B60N 2/812; B60N 2/815
  USPC ........................................ 297/408, 409, 410
  See application file for complete search history.

(56) References Cited

U.S. PATENT DOCUMENTS

| | | | | |
|---|---|---|---|---|
| 391,206 | A * | 10/1888 | Snediker et al. | .... B60N 2/4879 297/401 |
| 426,069 | A * | 4/1890 | Rogers | ................... A45D 44/10 297/402 |
| 879,179 | A * | 2/1908 | Kersey | ................. A61G 15/125 297/409 |
| 3,226,159 | A | 12/1965 | Binding | |
| 3,542,429 | A * | 11/1970 | Inoue | ..................... B60N 2/818 297/410 |
| 4,576,413 | A | 3/1986 | Hatta | |
| 6,378,950 | B1 | 4/2002 | Takamizu et al. | |
| 6,616,235 | B1 | 9/2003 | Khavari et al. | |
| 7,681,955 | B2 | 3/2010 | Seo | |
| 2001/0040396 | A1 | 11/2001 | Kreuels et al. | |
| 2015/0343926 | A1 | 12/2015 | Tachikawa et al. | |

FOREIGN PATENT DOCUMENTS

FR 2068836 A5 * 9/1971 ............. B60N 2/818

* cited by examiner

*Primary Examiner* — Milon Nelson, Jr.
(74) *Attorney, Agent, or Firm* — Vichit Chea; Price Heneveld LLP

(57) ABSTRACT

A headrest assembly is provided herein. A mounting assembly is pivotally coupled to a seatback. A frame is movably coupled to the mounting assembly. A locking device is coupled to the mounting assembly and is movable between an unlock position to enable at least one of translational displacement and rotational displacement of the frame, and a lock position to retain the frame in a selected position.

16 Claims, 5 Drawing Sheets

ADJUSTABLE HEADREST ASSEMBLY FOR VEHICLE SEAT

FIELD OF THE INVENTION

The present invention generally relates to a headrest for a vehicle seat, and more particularly, to an adjustable headrest assembly.

BACKGROUND OF THE INVENTION

Some vehicle seats enable a user to adjust the position of a headrest. However, adjustments are typically limited to height adjustment of the headrest. Additionally, headrests having greater adjustability suffer from complex design incurring greater cost. Accordingly, there is a need for a simple and cost effective headrest assembly benefiting from multi-adjustability. The present disclosure is intended to satisfy this need.

SUMMARY OF THE INVENTION

According to a first aspect of the present disclosure, a headrest assembly is provided. A mounting assembly is pivotally coupled to a seatback. A frame is movably coupled to the mounting assembly. A locking device is coupled to the mounting assembly and is movable between an unlock position to enable at least one of translational displacement and rotational displacement of the frame, and a lock position to retain the frame in a selected position.

Embodiments of the first aspect of the disclosure can include any one or a combination of the following features:
  the locking device is rotatably coupled to the mounting assembly about a common axis of rotation;
  the locking device includes a tab configured to engage one of a plurality of pivoting members disposed along a length of the frame in the lock position;
  translational displacement of the frame adjusts a height of the frame;
  the mounting assembly includes a retention feature comprising a plurality of apertures and the locking device includes a projection configured to be received in one of the plurality of apertures in the lock position;
  the apertures are disposed concentrically on the retention feature; and
  the position of the apertures is associated with a unique angular position of the frame.

According to a second aspect of the present disclosure, a headrest assembly is provided. A mounting assembly is pivotally coupled to a seatback. A frame is movably coupled to the mounting assembly. A locking device is movably coupled to the mounting assembly and configured to engage the frame to maintain the frame at a selected height, and engage the mounting assembly to maintain the frame at a selected angular position.

Embodiments of the second aspect of the disclosure can include any of or a combination of the following features:
  the mounting assembly includes a retention feature comprising a plurality of apertures and the locking device includes a projection configured to be received in one of the plurality of apertures when the locking device engages the mounting assembly;
  the frame and mounting assembly are simultaneously engaged by the locking device;
  the locking device is configured to disengage the frame and the mounting assembly to simultaneously enable translational and rotational movement of the frame;
  the locking device is linearly displaced to disengage the frame and mounting assembly;
  the locking device includes a tab configured to engage a plurality of notches disposed along a length of the frame to maintain the frame at the selected height; and
  the locking device is rotatably coupled to the mounting assembly about a common axis of rotation.

According to a third aspect of the present disclosure, a headrest assembly is provided. First and second mounting assemblies are pivotally coupled to a seatback. A frame is movably coupled to the first and second mounting assemblies. A locking device is coupled to the first or second mounting assembly and movable between an unlock position to enable at least one of translational displacement and rotational displacement of the frame, and a lock position to retain the frame in a selected position.

Embodiments of the third aspect of the disclosure can include any one or a combination of the following features:
  the mounting assembly includes a retention feature fixedly coupled to the seatback, the retention feature comprising a plurality of apertures configured to engage a tab of the locking device to maintain the frame in the lock position;
  the position of the apertures is associated with a unique angular position of the frame;
  the locking device is rotatably coupled to the mounting assembly;
  the locking device includes a tab configured to engage one of a plurality of notches disposed along a length of the frame in the lock position; and
  simultaneous translational and rotational displacement of the frame is enabled when the locking device is in the unlock position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary and may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a headrest assembly for a vehicle. The headrest assembly enables adjustment of a headrest and includes a mounting assembly pivotally coupled to a seatback and a frame movably coupled to the mounting assembly. A locking device is coupled to the mounting assembly and is movable between an unlock position to enable at least one of translational displacement and rotational displacement of the frame, and a lock position to retain the frame in a selected position.

Figure 1:
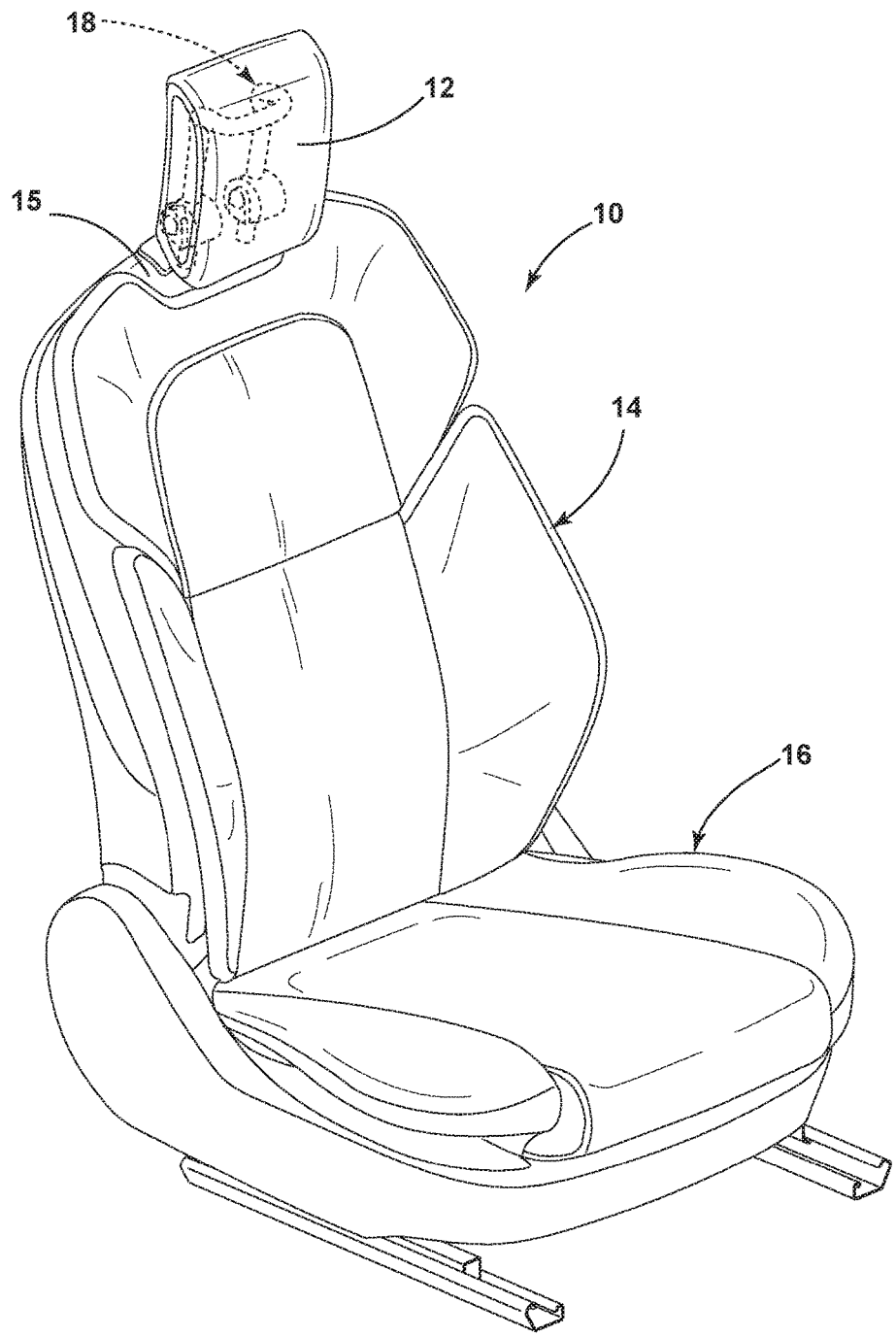
FIG. 1 is a perspective view of a vehicle seat including an adjustable headrest assembly.

Referring to FIG. 1, a vehicle seat 10 is shown. The vehicle seat 10 has a seatback 14 with a top portion 15 and an adjustable headrest 12 disposed above the top portion 15 and coupled to the seatback 14 via a headrest assembly 18. As described in greater detail herein, the headrest assembly 18 advantageously enables a user to make adjustments to a height of the headrest 12 and/or an angular position of the headrest 12 with respect to the seatback 14. The seatback 14 may be rotatably coupled to a seat base 16 and conventionally mounted to a vehicle. It will be understood that the vehicle seat 10 may correspond to a driver seat or a passenger seat.

Figure 2:
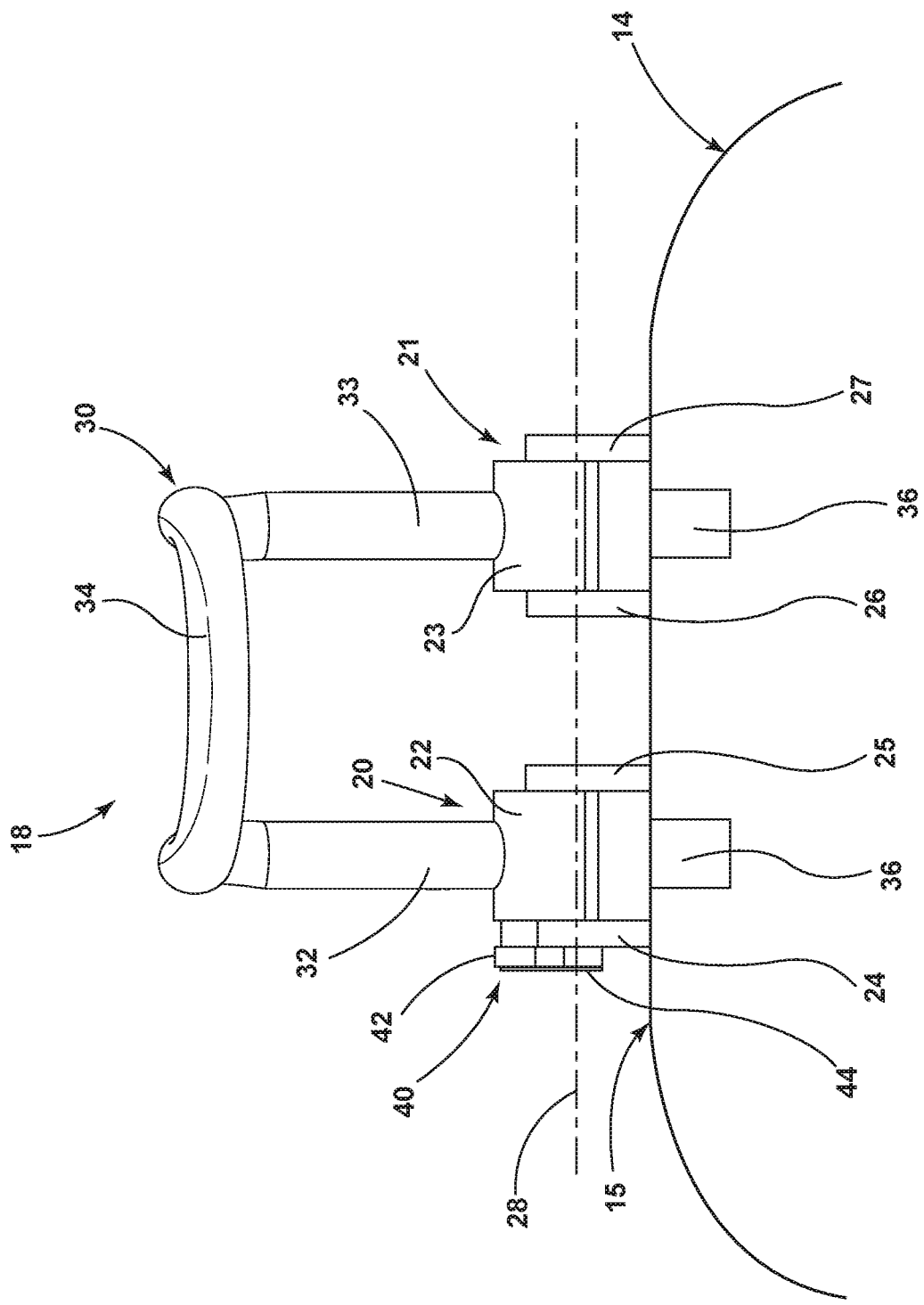
FIG. 2 illustrates a locking device of the assembly in a lock position.
Figure 3:
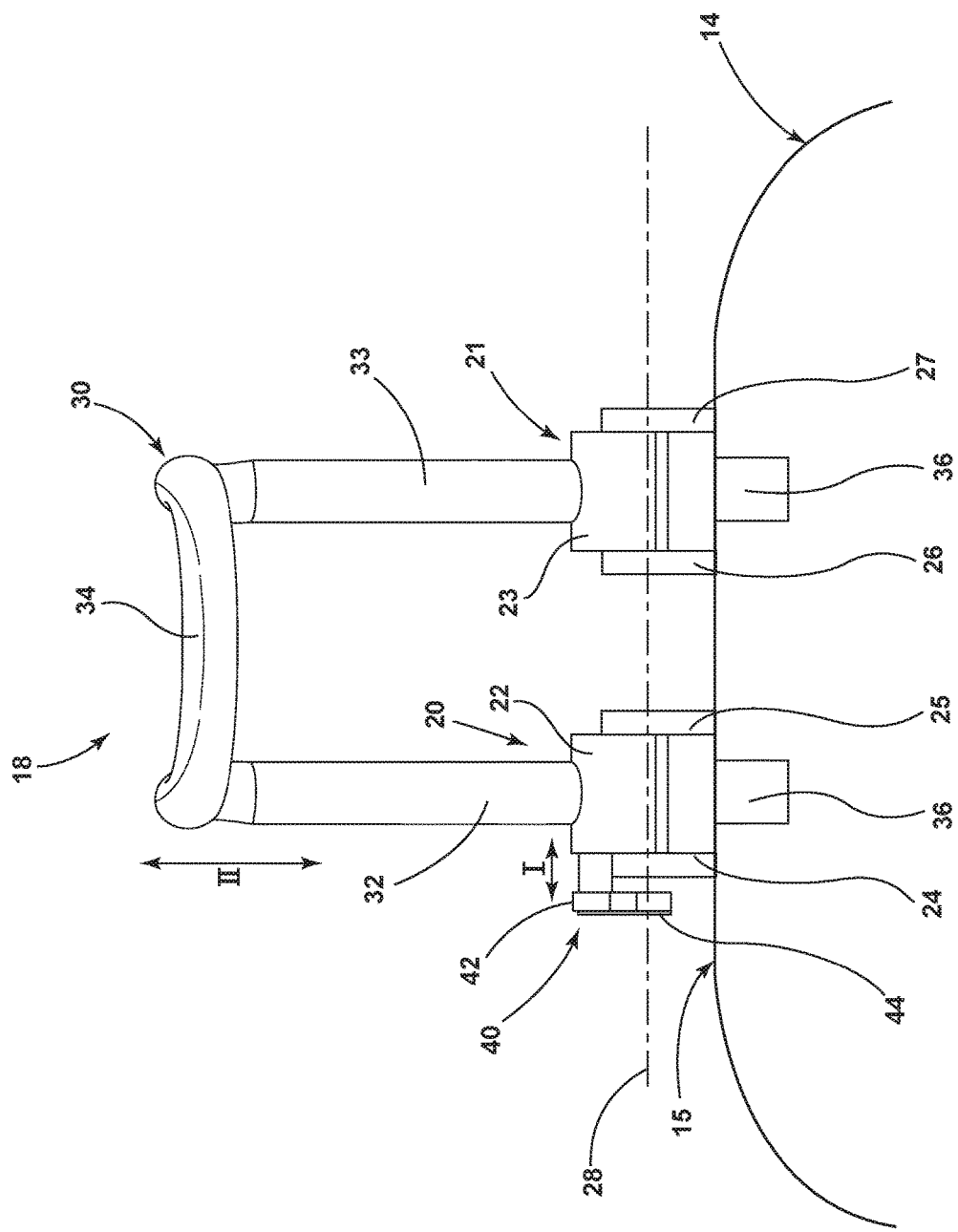
FIG. 3 illustrates the locking device in an unlock position to enable height adjustment of the frame.
Figure 4:
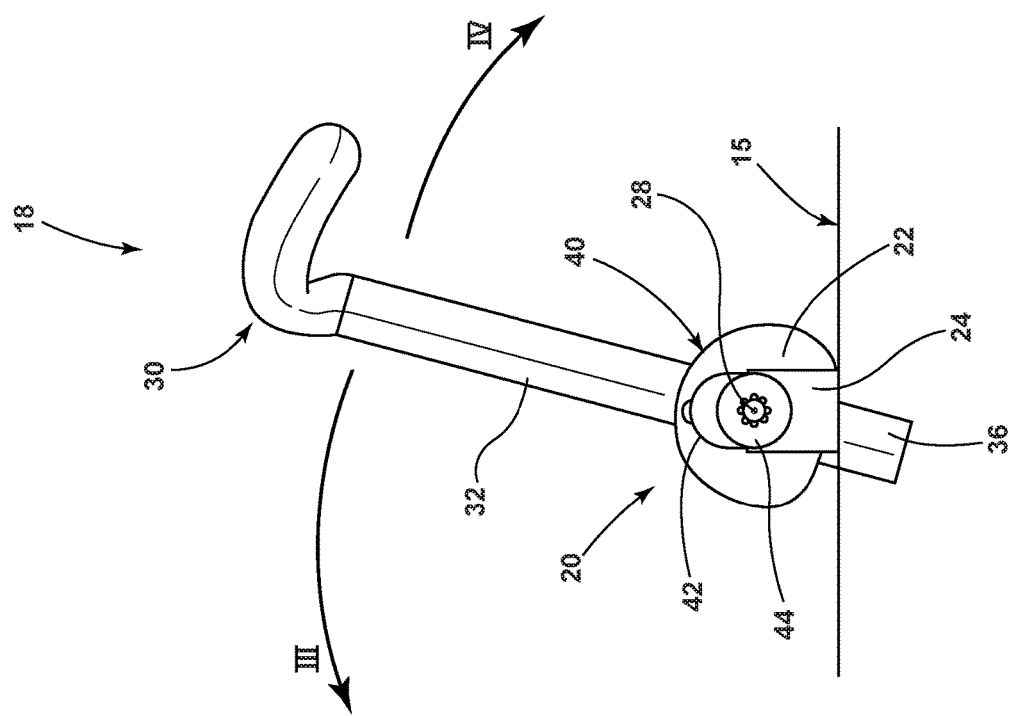
FIG. 4 again illustrates the locking device in the unlock position to enable adjustment to an angular position of the frame.

Referring to FIGS. 2-4, the headrest assembly 18 includes a first and a second mounting assembly 20, 21 coupled to the seatback 14. Mounting assemblies 20 and 21 respectively include a first and a second pivoting member 22, 23. Pivoting member 22 is disposed between and is pivotally coupled to first and second retention features 24 and 25, whereas pivoting member 23 is disposed between and is pivotally coupled to third and fourth retention features 26 and 27. As depicted, pivoting members 22 and 23 are configured to rotate about a common axis of rotation shown by line 28. The retention features 24, 25, 26, 27 are stationary and the pivoting members 22, 23 may be flush with the top portion 15 of the seatback 14. In other variations, the pivoting members 22, 23 may be raised above or recessed relative to the top portion 15 of the seatback 14.

A frame 30 is partially located within the headrest 12 and is movably coupled to the pivoting members 22, 23. The frame 30 includes a first beam 32, a second beam 33, and an intermediate beam 34 extending therebetween. The intermediate beam 34 is generally U-shaped and extends forward relative to beams 32 and 33. In the current embodiment, the frame 30 is generally depicted as a unitary structure and may be constructed from metal, plastic, or other suitable material having rigid characteristics. In other embodiments, the intermediate beam 34 may extend from beams 32 and 33 at different angles. In some embodiments, the frame 30 may be pieced together and/or include fixtures configured to provide additional support to the headrest 12.

Referring to FIG. 2, the frame 30 is exemplarily shown in a lowered position with a lower portion 36 of beams 32 and 33 extending within the seatback 14. A locking device 40 is coupled to mounting assembly 20. The locking device 40 includes an upper portion 42 and a lower portion 44 in abutting contact with retention feature 24. In the depicted embodiment, the locking device 40 is in the lock position, whereby the upper portion 42 engages the frame 30 and the lower portion 44 engages retention feature 24 so that the frame 30 is retained in the lowered position.

Referring to FIG. 3, the frame 30 is exemplarily shown in an elevated position with the locking device 40 in the unlock position. As shown by arrow I, the locking device 40 may be linearly displaced in a direction that is parallel with respect to the common axis of rotation 28 and in a direction that is orthogonal with respect to beams 32 and 33 of the frame 30. Linear displacement of the locking device 40 simultaneously disengages the upper portion 42 of the locking device 40 from the frame 30 and the lower portion 44 of the locking device 40 from retention feature 24. This enables translational movement of the frame 30 relative to the mounting assemblies 20, 21, thus allowing a user to increase or decrease the height of the frame 30 in the direction specified by double arrow II by pulling up or pushing down on the headrest 12 (not shown). Additionally, or alternatively, the user may adjust an angular position of the frame 30, as will be described below.

Referring to FIG. 4, the locking device 40 is again shown in the unlock position, thus allowing the user to make an adjustment to the angular position of the frame 30. As described herein, the pivoting members 22, 23 are rotatably coupled to respective retention features 24, 25, 26, and 27 at the common axis of rotation 28, which points into the page in FIG. 3. When the locking device 40 is in the unlock position, rotational movement of the pivoting members 22, 23 and the frame 30 is possible about the common axis of rotation 28. With respect to the embodiments described herein, the locking device 40 is configured to rotate alongside pivoting member 22 about the common axis of rotation 28. Accordingly, while the locking device 40 is in the unlock position, the user is free to move the headrest 12 (not shown) to a selected forward or rearward position in the direction specified by arrow III or arrow IV, respectively. Once a desired height and/or angular position of the frame 30 is set, the user moves the locking device 40 back to the lock position to simultaneously reengage the upper portion 42 of the locking device 40 to the frame 30 and the lower portion 44 of the locking device 40 to retention feature 24, and as a result, the position of the frame 30 and the pivoting member 22 is retained.

Figure 5:
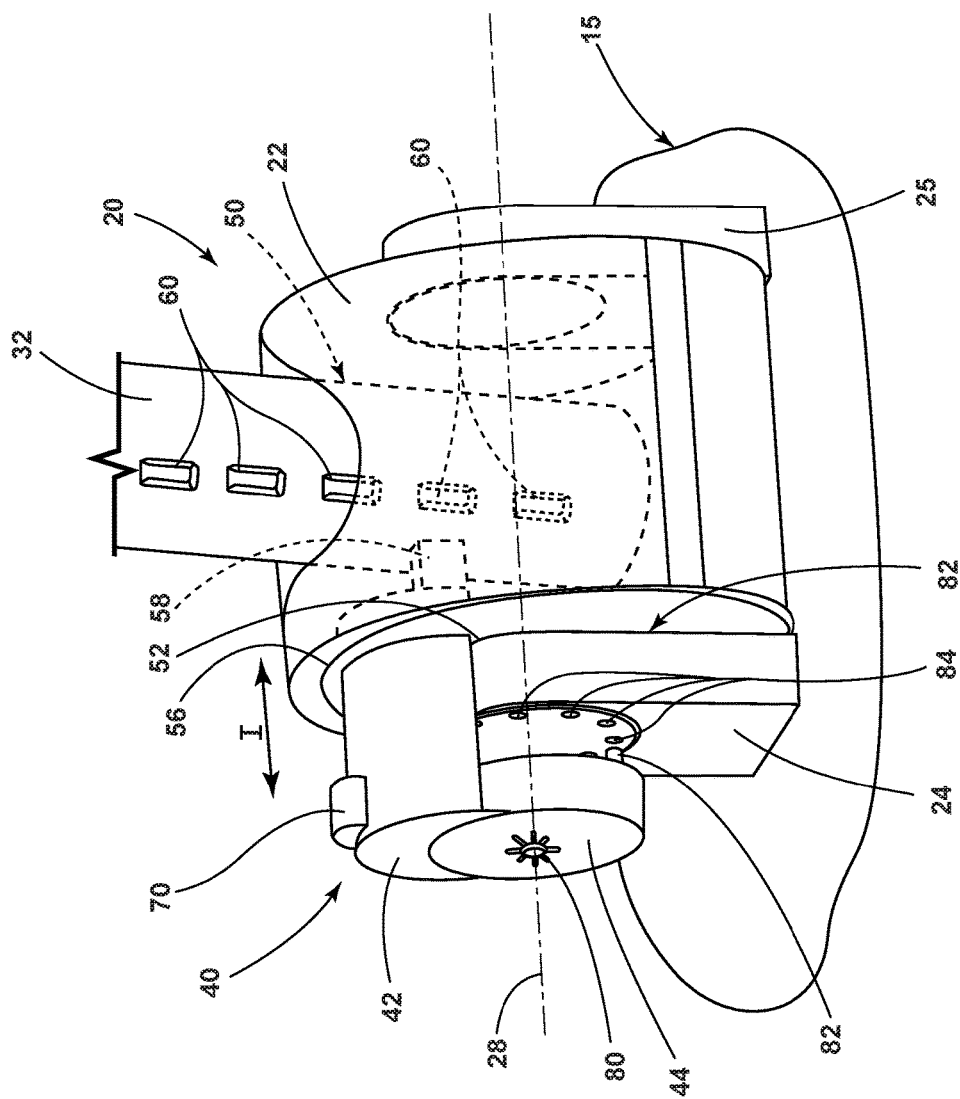
FIG. 5 is a detailed perspective view of the assembly and the locking device shown in the unlock position.

Referring to FIG. 5, the locking device 40 is shown in the unlock position for purposes of understanding. In the depicted embodiment, pivoting member 22 includes a channel 50 extending therethrough and configured to accommodate beam 32 of the frame 30. While not shown, it will be understood that pivoting member 23 may be similarly configured to accommodate beam 33 of the frame 30. The upper portion 42 of the locking device 40 is crescent shaped and at least partially encircles a rounded end 52 of retention feature 24. Additionally, the upper portion 42 partially extends through a sidewall 56 of the pivoting member 22 and includes a tab 58 configured to engage one of a plurality of notches 60 extending a length of beam 32 and each associated with a height adjustment of the frame 30.

In the unlock position, the tab 58 is disengaged from beam 32 to enable translational movement of the frame 30 with respect to pivoting member 22. To retain the frame 30 at a selected height, the tab 58 is aligned with one of the plurality of notches 60 and subsequent linear displacement of the locking device 40 to the lock position engages the tab 58 to the one of the plurality of notches 60. For convenience, the upper portion 42 includes a grip 70 configured to allow a user to manipulate the locking device 40 between the lock position and the unlock position.

With continued reference to FIG. 5, the lower portion 44 of the locking device 40 is shown having a circular configuration and the common axis of rotation 28 intersects a centerpoint 80 of the lower portion 44 of the locking device 40. The lower portion 44 includes a projection, shown as pin 82, which points toward retention feature 24 when the locking device 40 is in the unlock position. The retention feature 24 includes a plurality of apertures, illustrated as pinholes 84, which are spaced concentrically about the common axis of rotation 28. The pinholes 84 are separated at equal intervals, each pinhole 84 being equidistant from the common axis of rotation 28. While the locking device 40 is in the unlock position, rotational adjustment of the pivoting member 22 and the frame 30 is enabled. Specifically, the lower portion 44 of the locking device 40 is configured to rotate alongside the pivoting member 22 about the common axis of rotation 28 to align the pin 82 with one of the plurality of pinholes 84. Additionally, the upper portion 42 of the locking device 40 is configured to rotate about the common axis of rotation 28 and the rounded end 50 of retention feature 24. Subsequent linear displacement of the locking device 40 toward the lock position engages the pin 82 to one of the plurality of pinholes 84 and the angular position of the frame 30 is retained. While a number of pinholes 84 are illustrated in FIG. 5, it will be understood that more or fewer pinholes 84 may be used in other embodiments to increase or decrease the number of angular positions of the headrest 12.

Accordingly, a headrest assembly for a vehicle seat has been advantageously provided herein. The assembly includes an easy to use locking device movable between an unlock position and a lock position. In operation, the user is free to make adjustments to the height and/or angular position of a headrest while the locking device is in the unlock position. When the locking device is moved to the lock position, the current height and angular position of the headrest is simultaneously retained via a single motion. In the lock position, both translational and rotational adjustment of the headrest are disabled and a user desiring to make any adjustments in height and/or angular position of the headrest is first required to move the locking device to the unlock position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A headrest assembly for a vehicle, comprising:
   a mounting assembly pivotally coupled to a seatback and including:
      a retention feature having a plurality of apertures;
   a frame movably coupled to the mounting assembly and including:
      a plurality of notches disposed along a length of the frame; and
   a locking device coupled to the mounting assembly and positionable in an unlock position with a single motion to enable translational displacement and rotational displacement of the frame, and a lock position to retain the frame in a selected position, the locking device including:
      a tab configured to be received in one of the plurality of notches in the lock position; and
      a projection configured to be received in one of the plurality of apertures in the lock position.

2. The headrest assembly of claim 1, wherein the locking device is rotatably coupled to the mounting assembly about a common axis of rotation.

3. The headrest assembly of claim 1, wherein translational displacement of the frame adjusts a height of the frame.

4. The headrest assembly of claim 1, wherein the apertures are disposed concentrically on the retention feature.

5. The headrest assembly of claim 4, wherein each position of the apertures is associated with a unique angular position of the frame.

6. A headrest assembly, comprising:
   a mounting assembly pivotally coupled to a seatback;

a frame movably coupled to the mounting assembly; and
a locking device movably coupled to the mounting assembly and configured to:
  engage the frame to retain the frame at a selected height; and
  engage the mounting assembly to maintain the frame at a selected angular position, wherein the frame is selectively extendable into the seatback, wherein the locking device is configured to disengage the frame and the mounting assembly to simultaneously enable translational and rotational movement of the frame wherein the locking device is linearly displaced to disengage the frame and the mounting assembly.

7. The headrest assembly of claim 6, wherein the locking device comprises a tab configured to engage a plurality of notches disposed along a length of the frame to retain the frame at the selected height.

8. The headrest assembly of claim 6, wherein the locking device is rotatably coupled to the mounting assembly about a common axis of rotation.

9. The headrest assembly of claim 6, wherein the mounting assembly comprises a retention feature having a plurality of apertures and the locking device comprises a projection configured to be received in one of the plurality of apertures to maintain the frame at the selected angular position.

10. The headrest assembly of claim 6, wherein the locking device is configured to simultaneously engage the frame and the mounting assembly.

11. A headrest assembly for a vehicle seat comprising:
first and second mounting assemblies mounted to a seatback for receiving respective first and second beams of a frame;
a locking device disposed on at least one of the first and second mounting assemblies and selectively positionable in a locked position or an unlocked position to regulate one or more of a translational and a rotational displacement of the frame, the locking device including:
  a first portion configured to selectively engage the first or the second beam to regulate the translational displacement of the frame; and
  a second portion configured to selectively engage at least one of the first and second mounting assemblies to regulate the rotational displacement of the frame, wherein when the locking device is moved from the unlocked position to the locked position, the translational displacement and the rotational displacement are simultaneously retained through a single motion of the locking device.

12. The headrest assembly of claim 11, wherein the first portion of the locking device comprises:
  an upper portion; and
  a tab for selectively engaging one of a plurality of notches disposed along the first or the second beam.

13. The headrest assembly of claim 12, wherein the second portion of the locking device comprises:
  a lower portion; and
  a pin for engaging one of a plurality of pinholes disposed on the at least one of the first and second mounting assemblies.

14. The headrest assembly of claim 11, wherein the first and second mounting assemblies are pivotally coupled to the seatback.

15. The headrest assembly of claim 11, wherein the locking device is rotatably coupled to the at least one of the first and second mounting assemblies about a common axis of rotation with the at least one of the first and second mounting assemblies.

16. The headrest assembly of claim 11, wherein the frame further comprises:
  a u-shaped portion disposed between the first beam and the second beam.

* * * * *